(12) United States Patent
Li et al.

(10) Patent No.: US 8,988,339 B2
(45) Date of Patent: Mar. 24, 2015

(54) STEREOSCOPIC IMAGE DISPLAYING SYSTEM AND METHOD

(75) Inventors: Hung-chun Li, Shulin (TW); Yi-chiang Lai, Dayuan Township (TW); Chun-chieh Chiu, Luzhu Township (TW)

(73) Assignee: Chunghwa Picture Tubes Ltd., Bade (TW)

( * ) Notice: Subject to any disclaimer, the term of this patent is extended or adjusted under 35 U.S.C. 154(b) by 407 days.

(21) Appl. No.: 13/439,869

(22) Filed: Apr. 5, 2012

(65) Prior Publication Data

US 2013/0194520 A1 Aug. 1, 2013

(30) Foreign Application Priority Data

Jan. 30, 2012 (TW) ............... 101102882 A

(51) Int. Cl.
*G02F 1/13357* (2006.01)
*H04N 13/04* (2006.01)
*G09G 3/34* (2006.01)
*G09G 3/00* (2006.01)

(52) U.S. Cl.
CPC .......... *H04N 13/0438* (2013.01); *G09G 3/003* (2013.01); *G09G 3/342* (2013.01); *G09G 2310/0237* (2013.01); *G09G 2310/024* (2013.01); *G09G 2320/0209* (2013.01)
USPC .............................. 345/102; 345/419; 349/15

(58) Field of Classification Search
CPC ................. G06F 3/04815; G06F 2203/04802; G02B 27/2228; H04N 13/0044; H04N 13/0048
USPC .............. 345/4–9, 82, 87, 89, 102, 104, 105, 345/419; 349/15; 315/312
See application file for complete search history.

(56) References Cited

U.S. PATENT DOCUMENTS

| 6,992,650 B2 * | 1/2006 | Takei ............................ 345/89 |
| 7,235,934 B2 | 6/2007 | Hung et al. |
| 7,598,939 B2 | 10/2009 | Sumiyoshi et al. |
| 8,487,863 B2 * | 7/2013 | Park et al. .................... 345/102 |
| 2005/0259064 A1 * | 11/2005 | Sugino et al. ................. 345/102 |
| 2011/0149053 A1 | 6/2011 | Ito et al. |
| 2012/0147062 A1 * | 6/2012 | Seo et al. ..................... 345/690 |

FOREIGN PATENT DOCUMENTS

| CN | 102196293 A | 9/2011 |
| TW | I320161 | 2/2010 |

* cited by examiner

*Primary Examiner* — Amare Mengistu
*Assistant Examiner* — Stacy Khoo
(74) *Attorney, Agent, or Firm* — Mark M. Friedman

(57) ABSTRACT

A stereoscopic image displaying system and method are disclosed. The system comprises a display panel for periodically displaying a left-eye image and a right-eye image; a backlight plate that is divided into a plurality of regional light sources from top to bottom; a backlight controller for providing control signals to turn on the regional light sources, wherein in one image frame displaying period, the time points for turning on the respective regional light sources are different from each other, and turn-on durations are different from each other as well; and a pair of shutter glasses comprising a left-piece eyeglass and a right-piece eyeglass that are periodically and alternatively turned on and of for respectively receiving the left-eye image and the right-eye image. The stereoscopic display system can improve brightness performance of a liquid crystal display panel during displaying stereoscopic images, also minimize the occurrence of ghost images and crosstalk.

8 Claims, 10 Drawing Sheets

STEREOSCOPIC IMAGE DISPLAYING SYSTEM AND METHOD

TECHNICAL FIELD OF THE INVENTION

The present invention relates to a stereoscopic image displaying system and method, and more particularly, to a stereoscopic image displaying system and method being capable of controlling backlight turn-on time.

BACKGROUND OF THE INVENTION

Among current stereoscopic image displaying systems, there is one skill which utilizes a liquid crystal display panel to alternatively display a left-eye image and a right-eye image by a time-divisional approach. A user can experience stereoscopic perception when the user puts on a pair of shutter glasses, at such time the user's left eye receives the left-eye image and the user's right eye receives the right-eye image. A stereo image displaying system like the above-described needs to increase a frame rate up to 120 Hz, also has to increase vertical blanking interval (VBI) in order to provide sufficient time for the human eyes to receive the images.

FIG. 1 is a schematic diagram showing scanning timing and backlight turn-on timing in a conventional liquid crystal display panel. FIG. 2 is a schematic diagram showing data writing timing and backlight turn-on timing in the conventional liquid crystal display panel. In FIG. 1 and FIG. 2, the horizontal axis is a time axis, and the vertical axis shows corresponding positions of the liquid crystal display panel from top to bottom. The liquid crystal display panel is scanned from top to bottom through the gate lines. One image frame displaying period includes a displaying interval and a vertical blanking interval.

The conventional stereoscopic image displaying system works as follows. When writing the right-eye image data, two pieces of eyeglasses of the shutter glasses are turned off and the backlight is turned off as well. When every right-eye image data has been written, a right-piece eyeglass of the shutter glasses is turned on, scanning procedures turn into VBI, and the backlight is turned on as well. At this time, the right-eye image enters into the user's right eye. Similarly, when writing the left-eye image data, two pieces of eyeglasses of the shutter glasses are turned off and the backlight is turned off as well. When every left-eye image data has been written, a left-piece eyeglass of the shutter glasses is turned on, scanning procedures turn into VBI, and the backlight is turned on as well. At this time, the left-eye image enters into the user's left eye. By repeating above operations, the left-eye image and the right-eye image are experienced as a stereoscopic image in human's brain.

The left-piece eyeglass and the right-piece eyeglass of the shutter glasses are made of liquid crystal materials. The liquid crystal molecules need a response time for reaching a maximum transmittance. In the conventional stereoscopic image display system, the shutter glasses and the backlight are turned on at the same time and have the same turn-on duration. In this conventional skill, the image experienced by the user is incomplete and the image quality is not as good as anticipated. Moreover, the liquid crystal molecules in the liquid crystal display panel need a response time so as to present proper images. The duration which is from writing the image data into the liquid crystal display panel to turning on the shutter glasses is descending from top to bottom. That is to say, the liquid crystal molecules being located at the upper region of screen have much more response time. The response time for the liquid crystal molecules being located at the lower region of screen is relatively insufficient. As shown in FIG. 3, in a case of utilizing a single-domain over driving look-up table in conventional skills, the voltages for driving the liquid crystal molecules at the respective regions of screen are the same. The liquid crystal molecules being located at the upper region of screen are over driven while the driving intensity for the molecules being located at the lower region of screen is insufficient. Therefore, the brightness appeared on the upper region and the lower region is different, and this lead to poor image quality.

Referring to FIG. 4, another conventional stereoscopic image displaying system adopts a multi-domain over driving look-up table, which can select a best LUT (look-up table) value by determining positions on the screen. For example, the voltage used for driving the liquid crystal molecules at the upper region of screen is V1, the voltage used for driving the liquid crystal molecules at the middle region of screen is V2, and the voltage used for driving the liquid crystal molecules at the lower region of screen is V3, wherein V1<V2<V3. The duration which is from writing the image data into the upper region of the liquid crystal display panel then to turning on the shutter glasses is much longer; hence, a smaller LUT value (e.g., V1) is selected to modify the response velocity of the liquid crystal molecules thereon. The duration from writing the image data into the lower region of the liquid crystal display panel to turning on the shutter glasses is much shorter, and therefore a larger LUT value (e.g., V3) is selected to accelerate the response velocity of the liquid crystal molecules thereon. In such a manner, the response of the liquid crystal molecules at the upper, middle, and lower regions of the liquid crystal display panel is almost finished simultaneously at the time of turning on the shutter glasses.

However, in the conventional skill utilizing the multi-domain over driving LUT, the image presented on the lower region of screen still has poor quality since the response speed of the liquid crystal molecules is inherently limited and the liquid crystal molecules can not response instantly. Image crosstalk is easily to be appeared on the lower region of screen, and thereby causing a so-called ghost image. In addition, it needs to consistently determine the LUT value according to positions on the screen when utilizing the multi-domain over driving look-up table. This will make the system overloaded.

SUMMARY OF THE INVENTION

An objective of the present invention is to provide a stereoscopic image displaying system and method for improving brightness performance of a liquid crystal display panel during displaying stereoscopic images.

Another objective of the present invention is to provide a stereoscopic image displaying system and method for reducing the crosstalk or the occurrence of ghost images.

To achieve the above objective, the present invention provides a stereoscopic image displaying system which comprises: a display panel for periodically displaying a left-eye image for a user's left eye to view and a right-eye image for a user's right eye to view; a pair of shutter glasses comprising a left-piece eyeglass and a right-piece eyeglass that are periodically and alternately turned on and off for respectively receiving the left-eye image and the right-eye image; a backlight plate disposed corresponding to the display panel, the backlight plate is divided into a plurality of regional light sources from top to bottom; and a backlight controller for providing control signals to turn on the regional light sources, wherein during one image frame displaying period, the time points for turning on the respective regional light sources are different from each other, and turn-on durations that the respective regional light sources are tuned on are different from each other, wherein the backlight controller comprises: a microprocessor for providing an enable signal based on to the turn-on durations and the time points of the respective regional light sources; and a light source driver which is coupled to the microprocessor for respectively driving the regional light sources via different channels according to the enable signal, wherein driving currents which are provided by the light source driver and supplied to the regional light sources via the channels are different while an illuminated energy for every one of the regional light sources is the same in one image frame displaying period.

In another aspect, the present invention provides a stereoscopic image displaying method, which is applicable to a display device, the display device comprises a display panel and a backlight plate which is disposed corresponding to the display panel, the backlight plate is divided into a plurality of regional light sources from top to bottom, the stereoscopic image displaying method comprises steps of: periodically displaying a left-eye image for a user's left eye to view and a right-eye image for a user's right eye to view; providing a left-piece eyeglass and a right-piece eyeglass that are periodically and alternatively turned on and off for respectively receiving the left-eye image and the right-eye image; and providing control signals to turn on the regional light sources, wherein during one image frame displaying period, the time points for turning on the respective regional light sources are different from each other, and turn-on durations that the respective regional light sources are different from each other, and wherein the regional light sources are driven respectively via different channels, driving currents which are supplied to the regional light sources via the channels are different while an illuminated energy for every one of the regional light sources is the same in one image frame displaying period.

As compared to turning on the shutter glasses and backlight at the same time, and those conventional skills utilizing the multi-domain over driving LUT, the turn-on time points and turn-on durations of the respective regional light source of the backlight plate are designed appropriately in the present invention. In one image frame displaying period, the time points for turning on the respective regional light sources are different from each other, and the turn-on durations that the respective regional light sources are turned on are different from each other. Therefore, the present invention can improve the brightness performance of the liquid crystal display panel during displaying the stereoscopic images, and at the same time reduce the crosstalk or the occurrence of ghost images.

DETAILED DESCRIPTION OF THE INVENTION

Figure 1:
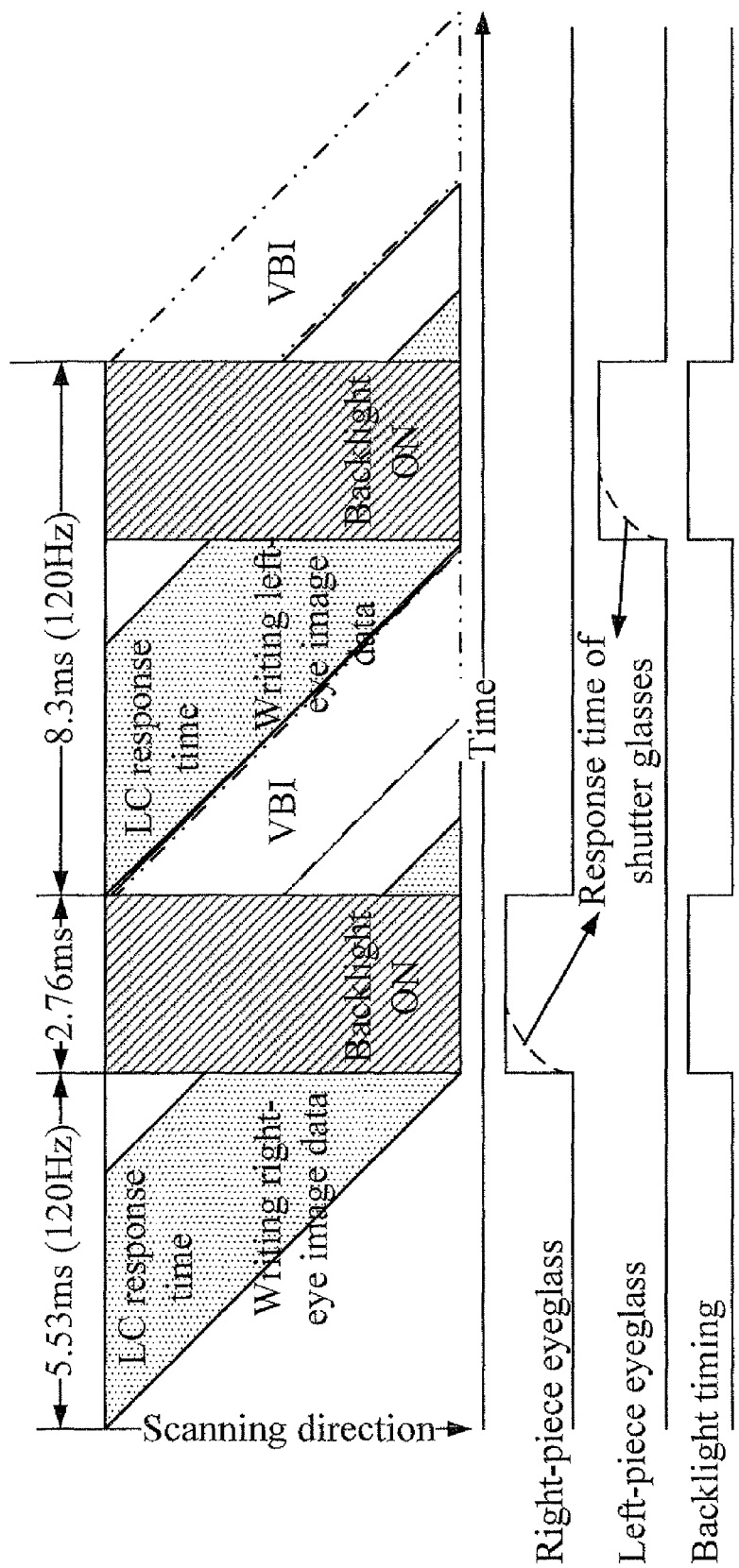
FIG. 1 is a schematic diagram showing scanning timing and backlight turn-on timing in a conventional liquid crystal display panel.
Figure 2:
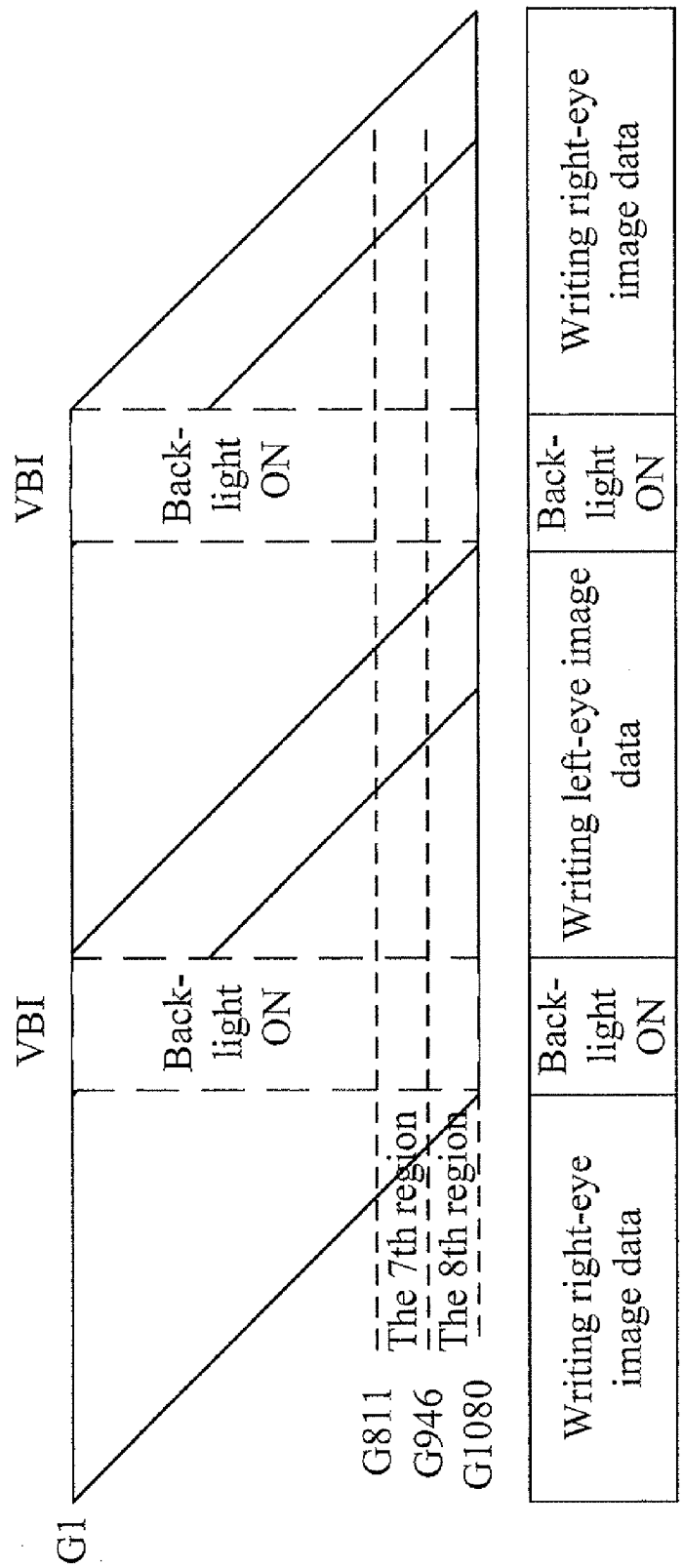
FIG. 2 is a schematic diagram showing data writing timing and backlight turn-on timing in the conventional liquid crystal display panel.
Figure 3:
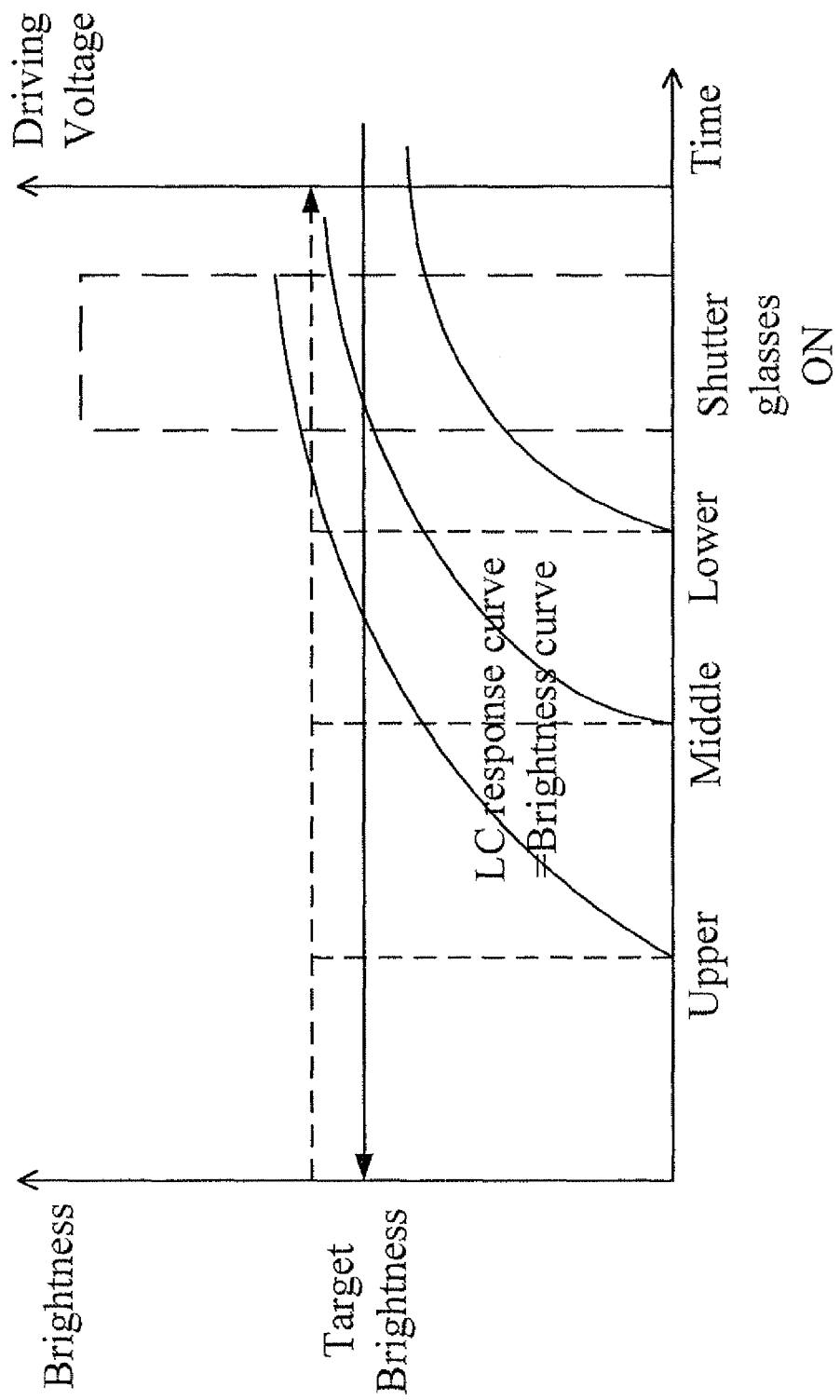
FIG. 3 is a schematic diagram showing response curves of liquid crystal molecules in a conventional liquid crystal display panel utilizing a single-domain over driving look-up table.
Figure 4:
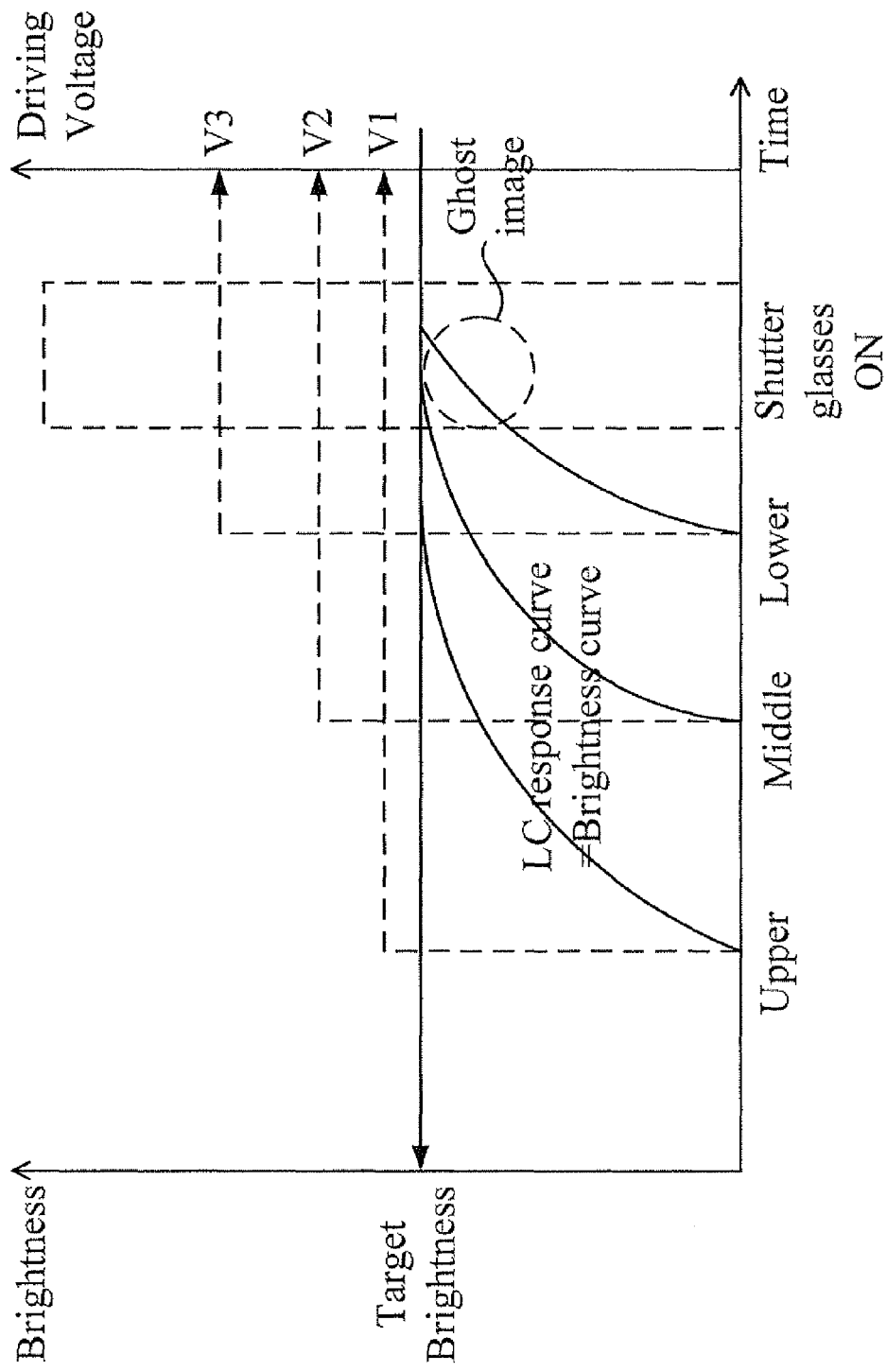
FIG. 4 is a schematic diagram showing response curves of liquid crystal molecules in a conventional liquid crystal display panel utilizing a multi-domain over driving look-up table.
Figure 5:
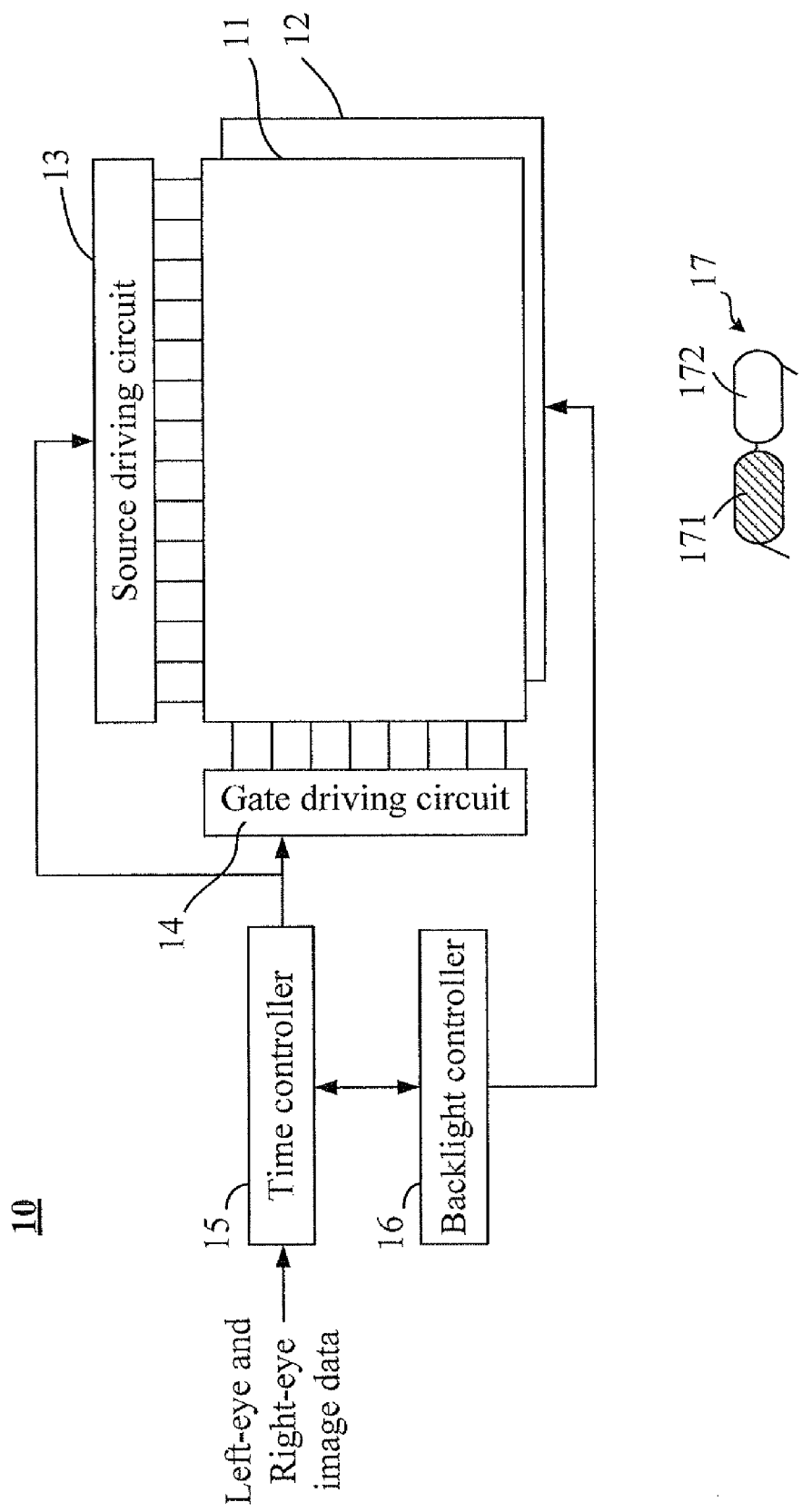
FIG. 5 is a schematic diagram showing a stereoscopic image displaying system of the present invention.

FIG. 5 is a schematic diagram showing a stereoscopic image displaying system of the present invention. As shown in FIG. 5, the stereoscopic image displaying system 10 of the present invention includes a display panel 11 (e.g., a liquid crystal display panel) in a display device and a pair of shutter glasses 17 (e.g., a liquid crystal shutter glasses) for viewing images displayed on the display panel 11. In the present invention, the display panel 11 periodically displays a left-eye image for a user's left eye to view and a right-eye image for a user's right eye to view by a time-divisional approach. The image displaying frequency of the display panel 11 of the present invention is at least greater than 120 Hz that is twice of the image displaying frequency of a traditional display panel. The pair of shutter glasses 17 has a left-piece eyeglass 171 and a right-piece eyeglass 172. The left-piece eyeglass 171 and the right-piece eyeglass 172 are periodically and alternatively turned on and off Specifically, the left-piece eyeglass 171 is turned on for receiving the left image and at this movement the right-piece eyeglass 172 is turned off; the right-piece eyeglass 172 is turned on for receiving the right image and at this movement the left-piece eyeglass 171 is turned off. By utilizing a parallax principle for the left image and the right image, stereoscopic perception can be experienced when the user puts on the shutter glasses 17 and then views the images displayed on the display panel 11.

As shown in FIG. 5, the stereoscopic image displaying system 10 of the present invention further includes a source driving circuit 13, a gate driving circuit 14, a time controller 15, a backlight plate 12, and a backlight controller 16. The backlight plate 12 is disposed in the rear of the liquid crystal display panel 11, correspondingly. The backlight plate 12 is utilized for providing illumination required for displaying images. The backlight plate 12 can be formed by utilizing light emitting diodes (LEDs) having excellent light emitting characters in accompany with a light guide plate.

As shown in FIG. 5, left-eye image data and right-eye image data are inputted to the time controller 15. The time controller 15 transforms the inputted left-eye image data and right-eye image data into signals for being inputted to the liquid crystal display panel 11. Also, the time controller 15 generates timing control signals that are provided for the source driving circuit 13 and the gate driving circuit 14. The source driving circuit 13 and the gate driving circuit 14 drive the liquid crystal display panel 11 to display the left-eye image and the right-eye image alternatively and periodically, according to the timing control signals and received left-eye and right-eye image signals. The backlight controller 16 controls the backlight plate 12 to be turned on or turned off by referring the timing control signals generated by the time controller 15. This will be described later.

Figure 6:
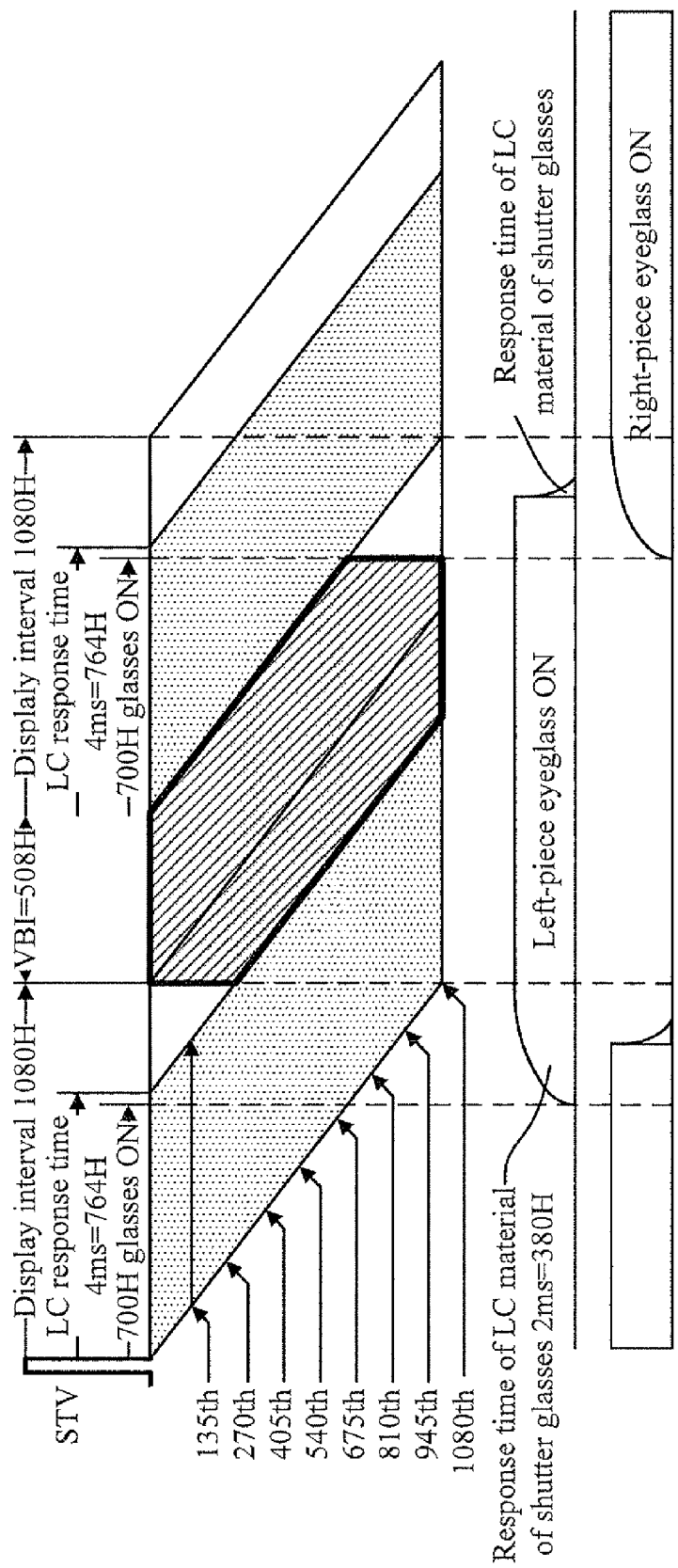
FIG. 6 is a schematic diagram showing a backlight driving principle for the stereoscopic image displaying system of the present invention.

FIG. 6 is a schematic diagram showing a backlight driving principle for the stereoscopic image displaying system of the present invention. In FIG. 6, the horizontal axis is a time axis, and the vertical axis shows corresponding positions of the liquid crystal display panel 11 from top to bottom. In this example, the liquid crystal display panel 11 has 1080 gate lines. After a start signal STV is inputted, the liquid crystal display panel 11 is scanned from top to bottom through the gate lines. As shown in FIG. 6, one image frame displaying period comprises a displaying interval and a vertical blanking interval. During the displaying interval, the spot area shown in FIG. 6 represents the response time of liquid crystal molecules in a liquid crystal layer of the liquid crystal display panel 11 after corresponding thin-film transistors are turned on and pixel data are inputted at that time. The liquid material of the left-piece eyeglass 171 and the right-piece eyeglass 172 of the liquid crystal shutter glasses 17 has a response time as well. The lower portion shown in FIG. 6 illustrates the timing for turning on/off the left-piece eyeglass 171 and the right-piece eyeglass 172 of the liquid crystal shutter glasses 17.

In the present invention, the backlight plate 12 is top-down divided into a plurality of regional light sources. For example, the first regional light sources correspond to an area between the first gate line and the $135^{th}$ gate line, the second regional light sources correspond to an area between the $135^{th}$ gate line and the $270^{th}$ gat line, and so on. The backlight controller 16 provides control signals to control the regional light sources to be turned on and off, respectively. The area filled with oblique lines as shown in FIG. 6 represents turn-on time points and durations of the respective regional light sources of the backlight plate 12. In the present invention, based on utilizing a single-domain over driving look-up table, the turn-on time points and durations of the regional light sources of the backlight plate 12 are designed appropriately in consideration of the response time of the liquid crystal molecules of the liquid crystal display panel 11 and the turn-on timing of the liquid crystal shutter glasses 17, thereby improving the brightness performance of the liquid crystal display panel 11 during displaying the stereoscopic images, and at the same time reducing the occurrence of ghost images.

The following descriptions are illustrated in a liquid crystal display panel with a resolution of 1920×1080. Assuming that the time required for scanning one gate line is 1 H, one image frame displaying period would take 1588 H, wherein the displaying interval occupies 1080 H and the vertical blanking interval occupies 508 H When the image displaying frequency is 120 Hz, the exact time for 1 H is 1/(120×1588) =5.25 μs. Therefore, the response time of the liquid crystal molecules is about 3.6 ms with respect to one scanned gate line. However, the response times may be different from each other due to different inputted pixel data. Therefore, the response time of the liquid crystal molecules is set as 4 ms=764 H herein. The response time of the liquid crystal material in the liquid crystal shutter glasses 17 is about 2 ms=380 H. The present invention is to control the turn-on timing of the regional light sources of the backlight plate 12 in consideration of the response time of the liquid crystal elements of the display panel 11 and the shutter glasses 17, thereby improving the quality of images displayed on lower portion of screen that are irresolvable in conventional skills utilizing a multi-domain over driving look-up table (LUT).

In order to avoid a crosstalk occurrence (often called a ghost image), that is to say, the user's left eye observes or views the right-eye image and the user's right eye observes or views the left-eye image when the user views the images displayed on the liquid crystal display panel 11 through the shutter glasses 17, the stereoscopic image displaying system 10 of the present invention should obey the rules as follows in controlling backlight.

Figure 7:
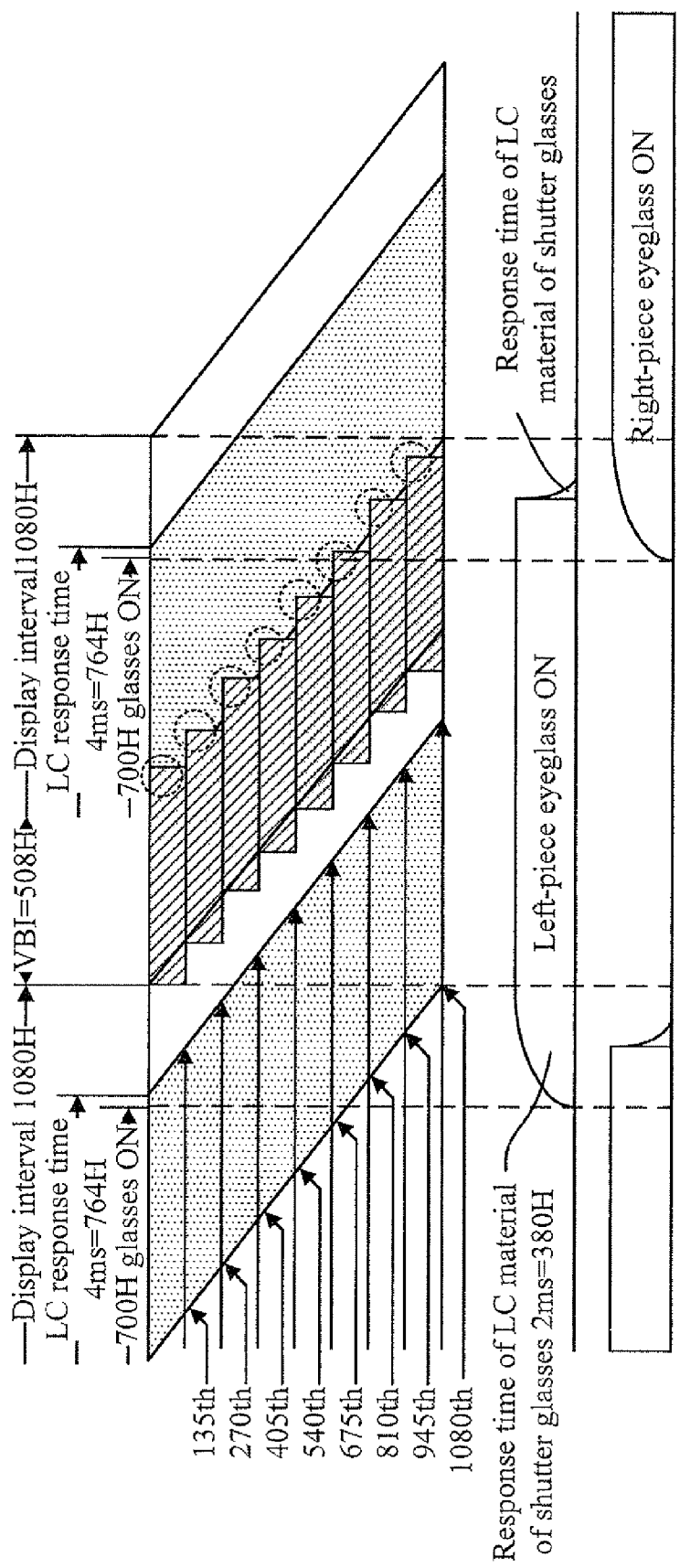
FIG. 7 is a schematic diagram showing that the turn-on interval of the respective regional light sources should not span the response time of liquid crystal molecules in a display panel of the present invention.

(1) As shown in FIG. 7, the turn-on interval of the respective regional light sources should not span the response time of the liquid crystal molecules in the liquid crystal layer of the display panel 11. As indicated in dashed circles of FIG. 7, the area filled with oblique lines that represents the turn-on interval of the respective regional light sources should not be overlapped with the dashed circle that represents the liquid crystal response time, or else the left-eye image and the right-eye image would induce a crosstalk.

Figure 8:
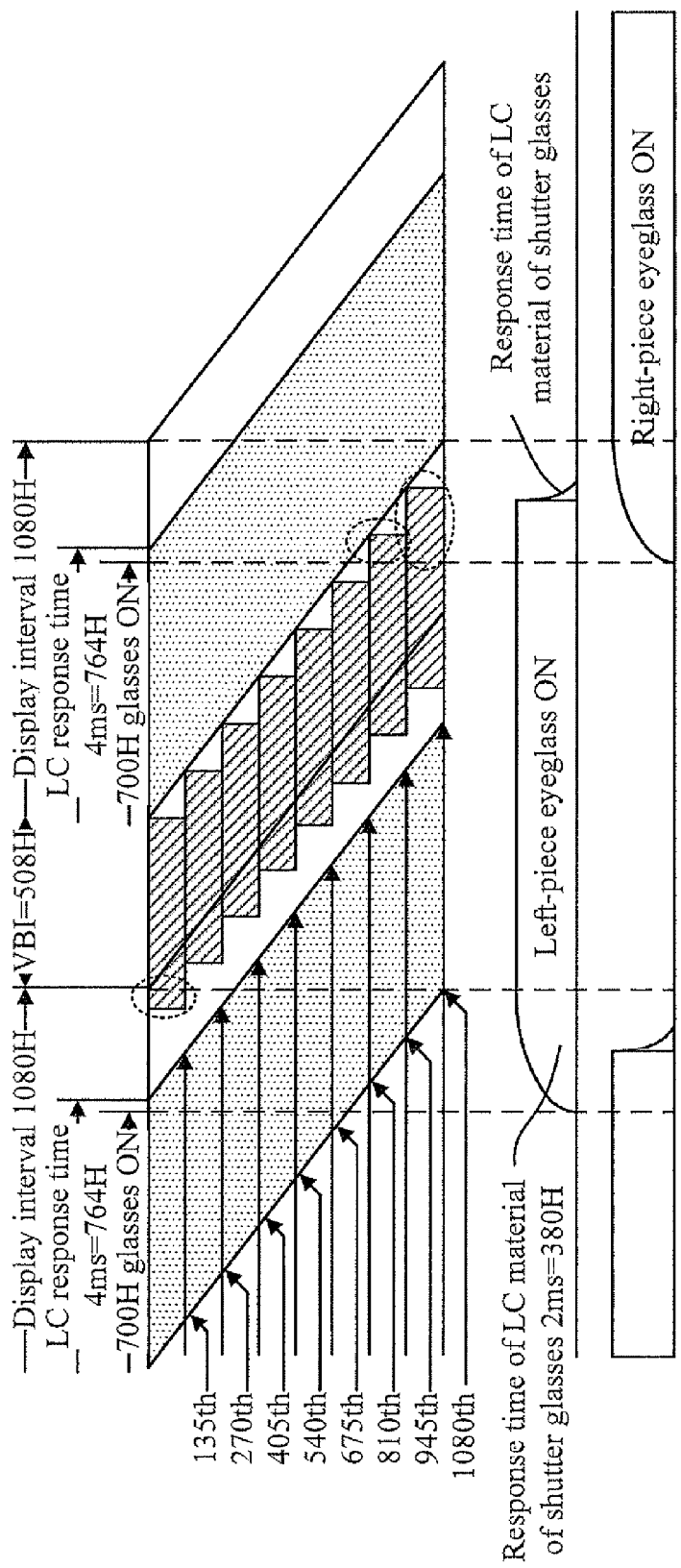
FIG. 8 is a schematic diagram showing that the turn-on interval of the respective regional light sources should not span the response time of liquid crystal material of a shutter glasses of the present invention.

(2) As shown in FIG. 8, the turn-on interval of the respective regional light sources should not span the response time of the liquid crystal material of the left-piece eyeglass 171 and the right-piece eyeglass 172 of the shutter glasses 11. As indicated in dashed circles of FIG. 8, the area filled with oblique lines that represents the turn-on interval of the respective regional light sources should not be overlapped with the response time of the left-piece eyeglass 171 and the right-piece eyeglass 172, or else the left-eye image and the right-eye image would induce a crosstalk.

Figure 9:
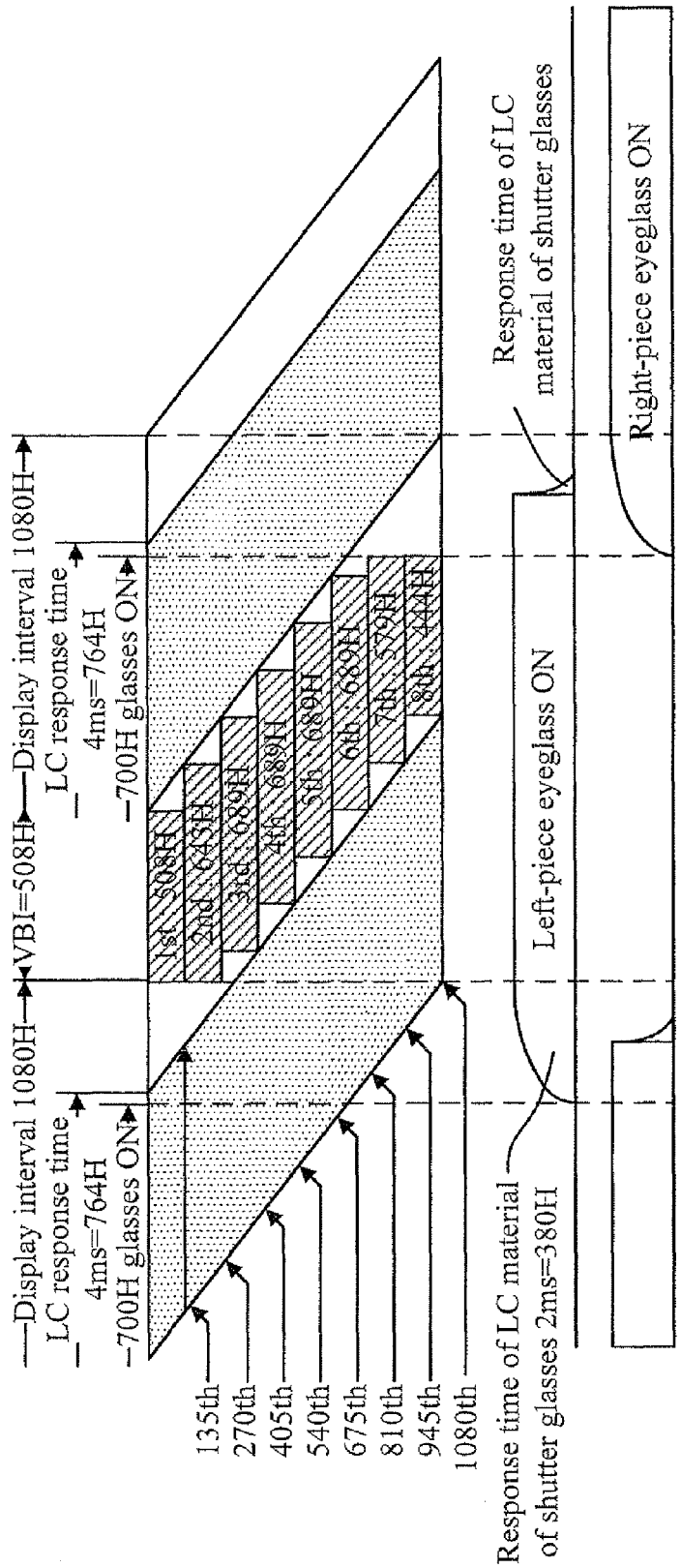
FIG. 9 is a schematic diagram showing the turn-on time points and durations of the respective regional light sources in the present invention.

The present invention is to appropriately design the turn-on time points and turn-on durations of the respective regional light sources of the backlight plate 12. In one image frame displaying period, the time points for turning on the respective regional light sources are different from each other, and the turn-on durations that the respective regional light sources are turned on are different from each other. Please refer to FIG. 9, which shows scanning timing and backlight timing in the present invention. Specifically, the following descriptions are illustrated with the scanning timing of the left-eye image corresponding to the left-piece eyeglass 171. The scanning timing of the right-eye image corresponding to the right-piece eyeglass 172 is similar thereto. The regional light sources of the backlight plate 12 are divided into eight regions. Each region covers 135 gate lines. The first regional light sources are turned on at the beginning of the VBI and are turned off at the end of the VBI. The VBI occupies 508 H, and therefore the turn-on duration of the first regional light sources occupies 508 H as well. The left-piece eyeglass 171 is absolutely tuned on when the first regional light sources are turned on. The response time of the left-piece eyeglass 171 is about 2 ms=380 H. Therefore, the left-piece eyeglass 171 is starting to be enabled at 700 H (1080 H−380 H=700 H). As compared to the turn-on duration of the first regional light sources, the turn-on duration of the second regional light sources is much longer for a period of scanning one gate line, that is, 135 H. Therefore, the turn-on duration of the second regional light sources is 643 H (508 H+135 H=643 H). As can be seen, among the turn-on timing of the respective regional light sources, the bottom edge of the triangle at right side as shown in FIG. 9 occupies 135 H. The turn-on duration of the third regional light sources can be obtained by geometric calculation, and the result is 689 H (1588 H−135 H−764 H=689 H). The turn-on durations of the fourth to sixth regional light sources are the same as that of the third regional light sources, and also are 689 H. The turn-on duration of the eighth regional light source is 444 H (1588 H−764 H−380 H=444 H). That is, one image frame displaying period subtracts the response time of the liquid crystal molecules of the display panel 11 and the response time of the right-piece eyeglass 172. As compared to the turn-on duration of the eighth regional light sources, the turn-on duration of the seven regional light sources is much longer for a period of scanning one gate line, that is, 135 H. Therefore, the turn-on duration of the seven regional light sources is 579 H (444 H+135 H=579 H). As shown in FIG. 9, the turn-on durations of the regional light sources located in an upper region of the backlight plate 12 are shorter than the turn-on durations of the regional light sources located in a middle region of the backlight plate 12; the turn-on durations of the regional light sources located in a lower region of the backlight plate 12 are shorter than the turn-on durations of the regional light sources located in a middle region of the backlight plate 12, and thereby preventing the left-eye image from interfering with the right-eye image and at the same time maintaining the image quality at the upper region and lower region of the liquid crystal display panel 11.

As compared to turning on the shutter glasses and backlight at the same time, and those conventional skills utilizing the multi-domain over driving look-up table, the turn-on time points and turn-on durations of the respective regional light source of the backlight plate are designed appropriately in the present invention. The present invention can improve the brightness performance of the liquid crystal display panel during displaying the stereoscopic images, and at the same time reduce the crosstalk or the occurrence of ghost images. With applying the stereoscopic image displaying system and method of the present invention, the turn-on durations of the respective regional light sources of the backlight plate can occupy 38.8% of one image frame displaying period. Also, the occurrence of crosstalk for the left-eye images is 9.7% at average and the occurrence of crosstalk for the right-eye images is 6.2% at average. This is better than conventional skills, known as 35.2% at average.

Figure 10:
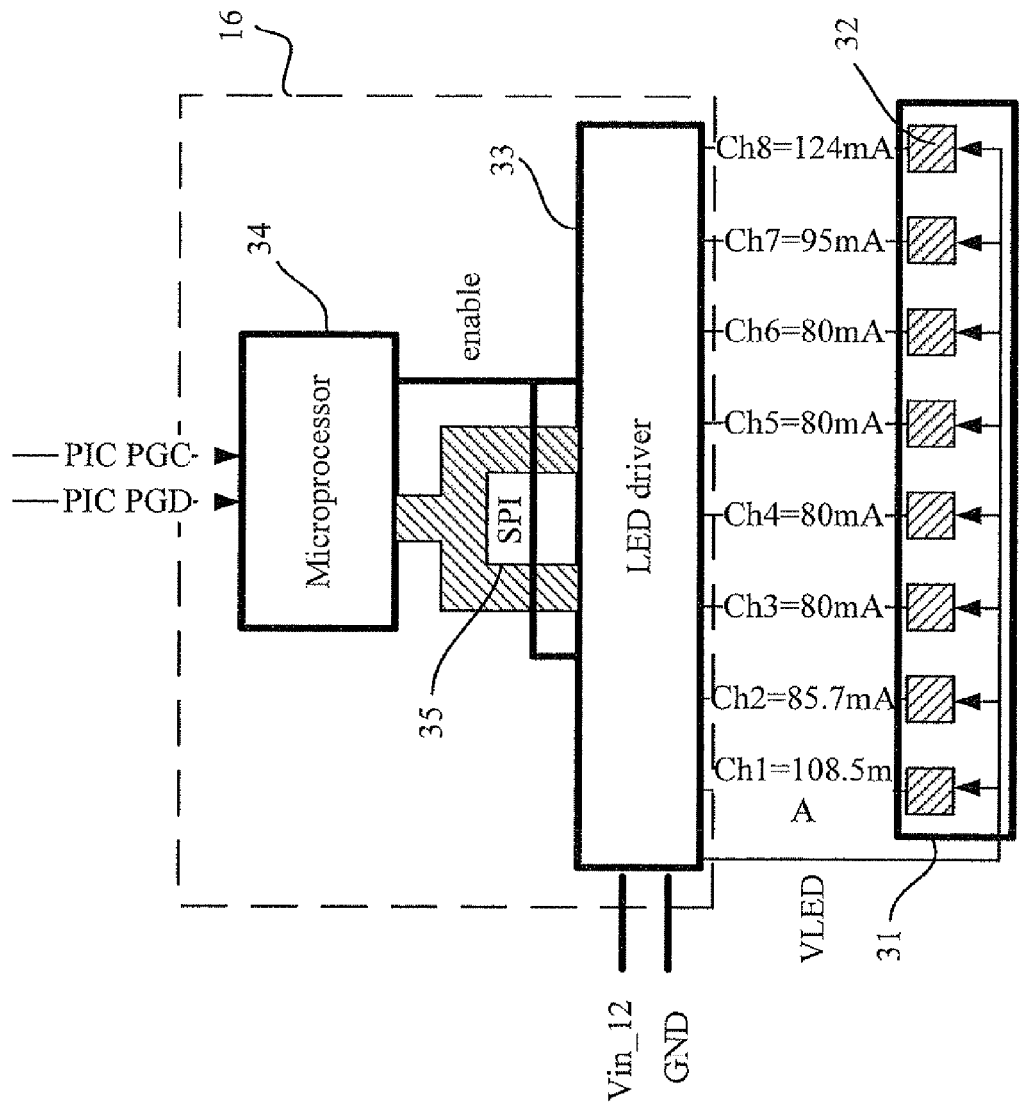
FIG. 10 is a schematic diagram showing a backlight controller and light sources in the present invention.

FIG. 10 is a schematic diagram showing the backlight controller and light sources in the present invention. In this example, the light sources are implemented by LEDs. The backlight controller 16 comprises a LED driver 33 and a microprocessor 34. The LED driver 33 and the microprocessor 34 are connected via a serial peripheral interface (SPI). The LED light source 31 is consisted of a plurality of LEDs 32. The LED light source 31 can be a direct-lit type backlight or an edge-lit type backlight. As shown in FIG. 10, the microprocessor 14 provides an enable signal to the LED driver 33 based on the turn-on time points and durations of the respective regional light sources. The LED driver 33 is connected to the respective LEDs 32 respectively via different channels, and also drives the respective LEDs via the channels according to the enable signal. In the present invention, driving currents provided by the LED driver 33 and supplied to the respective LEDs 32 via the channels are different while an illuminated energy for every one of the LEDs 32 is the same in one image frame displaying period, thereby making the brightness of the whole liquid crystal display panel 11 equal and stable. Assuming that the currents flowing into the third to sixth regional light sources shown in FIG. 9 are 80 mA and the illuminated energy for each region of the regional light sources is 80×689 mA·H in one image frame displaying period, the driving current provided for the first regional light sources would be 108.5 mA (80×689÷508=108.5 mA), the driving current provided for the second regional light sources would be 85.7 mA (80×689÷643=85.7 mA), the driving current provided for the seven regional light sources would be 95 mA (80×689÷579=95 mA), and the driving current provided for the eighth regional light sources would be 124 mA (80× 689÷444=124 mA).

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A stereoscopic image displaying system comprising:
   a display panel for periodically displaying a left-eye image for a user's left eye to view and a right-eye image for a user's right eye to view;
   a pair of shutter glasses comprising a left-piece eyeglass and a right-piece eyeglass which are periodically and alternately turned on and off for respectively receiving the left-eye image and the right-eye image;
   a backlight plate disposed corresponding to the display panel, the backlight plate being divided into a plurality of regional light sources from top to bottom; and
   a backlight controller for providing control signals to turn on the regional light sources, wherein during one image frame displaying period, time points for turning on the respective regional light sources are different from each other, and turn-on durations that the respective regional light sources are turned on are different from each other,
   wherein the backlight controller comprises:
   a microprocessor for providing an enable signal based on the turn-on durations and the time points of the respective regional light sources; and
   a light source driver coupled to the microprocessor, for driving the regional light sources respectively via different channels according to the enable signal, wherein driving currents which are provided by the light source driver and supplied to the regional light sources via the channels are different while an illuminated energy for every one of the regional light sources is the same in one image frame displaying period.

2. The stereoscopic image displaying system according to claim 1, wherein the display panel is a liquid crystal display panel having a liquid crystal layer, the backlight controller controls each regional light source and prevents a turn-on period of one regional light source from spanning a response period of liquid crystal molecules in the liquid crystal layer.

3. The stereoscopic image displaying system according to claim 1, wherein the left-piece eyeglass and the right-piece eyeglass of the shutter glasses are made of a liquid crystal material, the backlight controller controls each regional light source and prevents a turn-on period of one regional light source from spanning a response period of the liquid crystal material.

4. The stereoscopic image displaying system according to claim 1, wherein the turn-on durations of the regional light sources located in an upper region of the backlight plate are shorter than the turn-on durations of the regional light sources located in a middle region of the backlight plate.

5. The stereoscopic image displaying system according to claim 1, wherein the turn-on durations of the regional light sources located in a lower region of the backlight plate are shorter than the turn-on durations of the regional light sources located in a middle region of the backlight plate.

6. A stereoscopic image displaying method, which is applicable to a display device, the display device comprising a display panel and a backlight plate disposed corresponding to the display panel, the backlight plate being divided into a plurality of regional light sources from top to bottom, the stereoscopic image displaying method comprising steps of:

periodically displaying a left-eye image for a user's left eye to view and a right-eye image for a user's right eye to view;

providing a left-piece eyeglass and a right-piece eyeglass that are periodically and alternatively turned on and of for respectively receiving the left-eye image and the right-eye image; and providing control signals to turn on the regional light sources, wherein during one image frame displaying period, the time points for turning on the respective regional light sources are different from each other, and turn-on durations that the respective regional light sources are turned on are different from each other, and wherein the regional light sources are driven respectively via different channels, driving currents which are supplied to the regional light sources via the channels are different while an illuminated energy for every one of regional light sources is the same in one image frame displaying period.

7. The stereoscopic image displaying method according to claim 6, wherein the display panel comprises liquid crystal molecules, a turn-on period of one regional light source is prevented from spanning a response period of the liquid crystal molecules in the display panel during the step of providing control signals to turn on the regional light sources.

8. The stereoscopic image displaying method according to claim 6, wherein the left-piece eyeglass and the right-piece eyeglass are made of a liquid crystal material, a turn-on period of one regional light source is prevented from spanning a response period of the liquid crystal material during the step of providing control signals to turn on the regional light sources.

* * * * *

UNITED STATES PATENT AND TRADEMARK OFFICE
CERTIFICATE OF CORRECTION

PATENT NO. : 8,988,339 B2  
APPLICATION NO. : 13/439869  
DATED : March 24, 2015  
INVENTOR(S) : Li et al.

Page 1 of 1

It is certified that error appears in the above-identified patent and that said Letters Patent is hereby corrected as shown below:

In the Claims

Column 9:

Claim 6, line 5:
delete "of"
insert --off;--

Signed and Sealed this
Twenty-third Day of June, 2015

Michelle K. Lee
*Director of the United States Patent and Trademark Office*